US012623511B2

(12) United States Patent
Kim et al.

(10) Patent No.: US 12,623,511 B2
(45) **Date of Patent: *May 12, 2026**

(54) HEAT PUMP SYSTEM FOR VEHICLE

(71) Applicants: Hyundai Motor Company, Seoul (KR); Kia Corporation, Seoul (KR)

(72) Inventors: Jeawan Kim, Hwaseong-si (KR); Hochan An, Hwaseong-si (KR); Yeonho Kim, Seoul (KR); Man Hee Park, Suwon-si (KR); Yeong Jun Kim, Incheon (KR); Jae Yeon Kim, Hwaseong-si (KR); Hoyoung Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 263 days.

This patent is subject to a terminal disclaimer.

(21) Appl. No.: 18/494,127

(22) Filed: Oct. 25, 2023

(65) Prior Publication Data

US 2024/0367487 A1     Nov. 7, 2024

(30) Foreign Application Priority Data

May 3, 2023     (KR) ........................ 10-2023-0057516

(51) Int. Cl.
*B60H 1/32*     (2006.01)
*B60H 1/00*     (2006.01)

(52) U.S. Cl.
CPC ....... *B60H 1/3223* (2013.01); *B60H 1/00878* (2013.01); *B60H 2001/3297* (2013.01)

(58) Field of Classification Search
CPC .......... B60H 2001/3297; B60H 1/3223; B60H 1/00878
See application file for complete search history.

(56) References Cited

U.S. PATENT DOCUMENTS 5,704,219 A * 1/1998 Suzuki ............... B60H 1/00907
62/197
5,934,094 A * 8/1999 Itoh ......................... F25B 41/34
62/509

(Continued)

FOREIGN PATENT DOCUMENTS

KR        20220009707 A     1/2022

*Primary Examiner* — Nelson J Nieves
(74) *Attorney, Agent, or Firm* — Slater Matsil, LLP

(57) ABSTRACT

An embodiment heat pump system for a vehicle includes a compressor that compresses a refrigerant, a condenser connected to the compressor through a refrigerant line that condenses the refrigerant by heat-exchanging the refrigerant with a coolant, an evaporator connected to the condenser through the refrigerant line that evaporates the refrigerant, a gas injection device that selectively expands and flows the refrigerant and selectively supplies a portion of the supplied refrigerant to the compressor, a first refrigerant connection line having a first end connected to the refrigerant line and a second end connected to the gas injection device, a chiller that adjusts a temperature of the coolant by heat-exchanging the refrigerant introduced through the first refrigerant connection line with the coolant, and a second refrigerant connection line having a first end connected to the refrigerant line and a second end connected to the gas injection device.

20 Claims, 7 Drawing Sheets

(56) References Cited

U.S. PATENT DOCUMENTS

| 5,996,360 | A | * | 12/1999 | Tanaka | F25B 43/006 |
| | | | | | 62/509 |
| 10,000,108 | B2 | * | 6/2018 | Kobayashi | B60H 1/3223 |
| 10,220,677 | B2 | * | 3/2019 | Ohyama | B60H 1/00385 |
| 10,611,210 | B2 | * | 4/2020 | Schedel | B60H 1/00899 |
| 10,661,631 | B2 | * | 5/2020 | Kawano | B60H 1/22 |
| 11,254,190 | B2 | | 2/2022 | He et al. | |
| 11,571,948 | B2 | * | 2/2023 | Kim | B60H 1/32284 |
| 12,169,083 | B2 | * | 12/2024 | Shey | F25B 41/48 |
| 2020/0247215 | A1 | * | 8/2020 | Kozasa | F28F 1/128 |
| 2022/0088995 | A1 | * | 3/2022 | Kim | B60H 1/00278 |
| 2023/0070430 | A1 | * | 3/2023 | Michikawauchi | |
| | | | | | B60H 1/32284 |
| 2023/0131019 | A1 | * | 4/2023 | Shey | F25B 30/02 |
| | | | | | 62/160 |
| 2023/0182527 | A1 | * | 6/2023 | Kim | B60H 1/00485 |
| | | | | | 62/324.6 |
| 2023/0194136 | A1 | * | 6/2023 | Kim | B60H 1/3223 |
| | | | | | 62/324.4 |
| 2024/0100911 | A1 | * | 3/2024 | Kim | B60H 1/3228 |
| 2025/0153545 | A1 | * | 5/2025 | Kim | B60H 1/3229 |

* cited by examiner

HEAT PUMP SYSTEM FOR VEHICLE

CROSS-REFERENCE TO RELATED APPLICATIONS

This application claims the benefit of Korean Patent Application No. 10-2023-0057516, filed on May 3, 2023, which application is hereby incorporated herein by reference.

TECHNICAL FIELD

The present disclosure relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle driven by a power source of a fuel cell generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may be introduced into the vehicle interior, thereby deteriorating the ride comfort.

In addition, when heating the vehicle interior, the heating performance may be deteriorated due to the lack of a heat source, the electricity consumption may be increased due to the usage of the electric heater, and the power consumption of the compressor may be increased.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a heat pump system for a vehicle. Particular embodiments relate to a heat pump system for a vehicle capable of improving cooling and heating performance by applying a gas injection device selectively operating in an air conditioning mode of a vehicle interior.

Embodiments of the present disclosure provide a heat pump system for a vehicle capable of improving cooling and heating performance by applying a gas injection device selectively operating in an air conditioning mode of a vehicle interior to increase the flow rate of the refrigerant.

A heat pump system for a vehicle may include a compressor configured to compress a refrigerant, a condenser connected to the compressor through a refrigerant line and configured to condense the refrigerant by heat-exchanging the refrigerant supplied from the compressor with a coolant, an evaporator connected to the condenser through the refrigerant line and configured to evaporate the refrigerant by heat-exchanging the refrigerant supplied from the condenser with the coolant, a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating the refrigerant line, a first refrigerant connection line disposed between the compressor and the evaporator, the first refrigerant connection line having a first end connected to the refrigerant line and a second end connected to the gas injection device, a chiller provided on the first refrigerant connection line and configured to adjust a temperature of the coolant by heat-exchanging the refrigerant introduced through the first refrigerant connection line with the coolant, and a second refrigerant connection line disposed between the compressor and the condenser, the second refrigerant connection line having a first end connected to the refrigerant line and a second end connected to the gas injection device.

The gas injection device may include a gas-liquid separator configured to separate and selectively discharge a gaseous refrigerant and a liquid refrigerant from the refrigerant, wherein the refrigerant is interiorly introduced, a supply portion connected to the condenser through the refrigerant line and configured to receive the refrigerant supplied from the condenser, a first expansion valve connected to the second refrigerant connection line, provided between the gas-liquid separator and the supply portion, and configured to selectively expand the refrigerant supplied to the second refrigerant connection line or the refrigerant supplied to the supply portion and supply the expanded refrigerant to the gas-liquid separator, a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller, a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator, a discharge portion connecting the gas-liquid separator to the second expansion valve and the third expansion valve and configured to discharge the refrigerant from the gas-liquid separator to the second expansion valve or the third expansion valve, and a supply line connecting the gas-liquid separator to the compressor and configured to selectively supply the gaseous refrigerant from the gas-liquid separator to the compressor.

The second expansion valve and the third expansion valve may be disposed in parallel with the first expansion valve through the supply portion and the discharge portion.

The first, the second, and the third expansion valves may be selectively operated in an air conditioning mode of the vehicle including a cooling mode, a heating mode, or a dehumidification mode and may be configured to selectively expand the refrigerant while controlling flowing of the refrigerant supplied to the gas injection device.

The gas-liquid separator may be operated when the first expansion valve may expand the refrigerant in an air conditioning mode of the vehicle, and wherein the gas-liquid separator may be configured to supply the gaseous refrigerant to the compressor through the supply line to increase the flow rate of the refrigerant circulating the refrigerant line.

Each of the first expansion valve, the second expansion valve, and the third expansion valve may be a 3-way electronic expansion valve having two inlets and one outlet, and each of the first expansion valve, the second expansion valve, and the third expansion valve may be configured to selectively expand the refrigerant while controlling the flow of the refrigerant.

A heat pump system for a vehicle may include a compressor configured to compress a refrigerant, a condenser connected to the compressor through a refrigerant line and configured to condense the refrigerant by heat-exchanging the refrigerant supplied from the compressor with a coolant, an evaporator connected to the condenser through the refrigerant line and configured to evaporate the refrigerant by heat-exchanging the refrigerant supplied from the condenser with the coolant, an accumulator provided on the refrigerant line between the evaporator and the compressor, a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating the refrigerant line, a first refrigerant connection line disposed between the compressor and the evaporator, the first refrigerant connection line having a first end connected to the refrigerant line and a second end connected to the gas injection device, a chiller provided on the first refrigerant connection line and configured to adjust a temperature of the coolant by heat-exchanging the refrigerant introduced through the first refrigerant connection line with the coolant, and a second refrigerant connection line disposed between the compressor and the condenser, the second refrigerant connection line having a first end connected to the refrigerant line and a second end connected to the gas injection device. The gas injection device includes a gas-liquid separator configured to separate and selectively discharge a gaseous refrigerant and a liquid refrigerant from the refrigerant, wherein the refrigerant is interiorly introduced, a supply portion connected to the condenser through the refrigerant line and configured to receive the refrigerant supplied from the condenser, a first expansion valve connected to the second refrigerant connection line, provided between the gas-liquid separator and the supply portion, and configured to selectively expand the refrigerant supplied to the second refrigerant connection line or the refrigerant supplied to the supply portion and to supply the expanded refrigerant to the gas-liquid separator, a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller, a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator, a discharge portion connecting the gas-liquid separator to the second expansion valve and the third expansion valve and configured to discharge the refrigerant from the gas-liquid separator to the second expansion valve or the third expansion valve, a first supply line connecting the gas-liquid separator to the compressor and configured to selectively supply the gaseous refrigerant from the gas-liquid separator to the compressor, a control valve provided on the first supply line, and a second supply line having a first end connected to the control valve and a second end connected to the accumulator.

In a case in which the gas-liquid separator is operated in a cooling mode of the vehicle and cooling of a battery module is required, the second refrigerant connection line is configured to be closed by an operation of the first expansion valve, the first expansion valve is configured to expand the refrigerant supplied through the supply portion and supply the expanded refrigerant to the gas-liquid separator, the second expansion valve is configured to expand the refrigerant supplied from the gas-liquid separator through the discharge portion and flow the expanded refrigerant to the first refrigerant connection line connected to the chiller, the third expansion valve is configured to expand the refrigerant supplied from the gas-liquid separator through the discharge portion and flow the expanded refrigerant to the refrigerant line, the first supply line is configured to be opened by an operation of the control valve, the second supply line is configured to be closed by the operation of the control valve, and the gas-liquid separator is configured to supply the gaseous refrigerant to the compressor through the opened first supply line.

In a case in which an operation of the gas-liquid separator is not required in a cooling mode of the vehicle, the second refrigerant connection line is configured to be closed by the first expansion valve, the first and second expansion valves are configured to stop operating, a flow of the refrigerant to the gas-liquid separator may be blocked, the third expansion valve is configured to expand the refrigerant supplied through the supply portion and supply the expanded refrigerant to the evaporator through the refrigerant line, and the first and second supply lines are configured to be closed by an operation of the control valve.

In a case in which the gas-liquid separator is operated in a heating mode of the vehicle, and an ambient air heat, waste heat of an electrical component, and waste heat of a battery module are to be recollected, the second refrigerant connection line is configured to be closed by an operation of the first expansion valve, the first expansion valve is configured to expand the refrigerant supplied through the supply portion and supply the expanded refrigerant to the gas-liquid separator, the second expansion valve is configured to expand the refrigerant supplied from the gas-liquid separator through the discharge portion and flow the expanded refrigerant to the first refrigerant connection line connected to the chiller, the third expansion valve is configured to expand the refrigerant supplied from the gas-liquid separator through the discharge portion and supply the expanded refrigerant to the evaporator through the refrigerant line, the first supply line is configured to be opened by an operation of the control valve, the second supply line is configured to be closed by the operation of the control valve, and the gas-liquid separator is configured to supply the gaseous refrigerant to the compressor through the opened first supply line.

In a case in which an operation of the gas-liquid separator is not required in a heating mode of the vehicle and an ambient air heat and waste heat of an electrical component are to be recollected, the second refrigerant connection line is configured to be closed by an operation of the first expansion valve, the first expansion valve is configured to stop operating, the second expansion valve is configured to expand the refrigerant supplied through the supply portion and flow the expanded refrigerant to the first refrigerant connection line connected to the chiller, the third expansion valve is configured to expand the refrigerant supplied through the supply portion and supply the expanded refrigerant to the evaporator through the refrigerant line, a flow of the refrigerant to the gas-liquid separator may be blocked, and the first supply line and the second supply line is configured to be closed by an operation of the control valve.

In a state in which the gas-liquid separator is operated in a heating mode of the vehicle, and an ambient air heat, waste heat of an electrical component, and waste heat of a battery module are not to be recollected, the second refrigerant connection line is configured to be opened by an operation of the first expansion valve, the first expansion valve is configured to expand the refrigerant supplied through the second refrigerant connection line and supply the expanded refrigerant to the gas-liquid separator, the second expansion valve is configured to expand the refrigerant supplied through the supply portion and flow the expanded refrigerant to the first refrigerant connection line connected to the chiller, the third expansion valve is configured to stop operating, the first supply line is configured to be closed by an operation of the control valve, the second supply line is configured to be opened by the operation of the control valve, and the gas-liquid separator is configured to supply the gaseous refrigerant to the accumulator through the opened second supply line.

In a case in which warming-up of the compressor is required, the second refrigerant connection line is configured to be opened by an operation of the first expansion valve, the first expansion valve is configured to expand the refrigerant supplied through the second refrigerant connection line and supply the expanded refrigerant to the gas-liquid separator, the second expansion valve is configured to stop operating, the third expansion valve is configured to expand the refrigerant supplied through the supply portion and supply the expanded refrigerant to the evaporator through the refrigerant line, the first supply line is configured to be opened by an operation of the control valve, the second supply line may be closed by the operation of the control valve, and the gas-liquid separator is configured to supply the gaseous refrigerant to the compressor through the opened first supply line.

The control valve may be a 3-way valve configured to distribute flow rates while controlling flowing of the refrigerant.

A heat pump system for a vehicle includes a compressor configured to compress a refrigerant, a condenser connected to the compressor through a refrigerant line and configured to condense the refrigerant by heat-exchanging the refrigerant supplied from the compressor with a coolant, an evaporator connected to the condenser through the refrigerant line and configured to evaporate the refrigerant by heat-exchanging the refrigerant supplied from the condenser with the coolant, a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating the refrigerant line, a first refrigerant connection line disposed between the compressor and the evaporator, the first refrigerant connection line having a first end connected to the refrigerant line and a second end connected to the gas injection device, a chiller provided on the first refrigerant connection line and configured to adjust a temperature of the coolant by heat-exchanging the refrigerant introduced through the first refrigerant connection line with the coolant, a second refrigerant connection line disposed between the compressor and the condenser, the second refrigerant connection line having a first end connected to the refrigerant line and a second end connected to the gas injection device, and a cooling apparatus including a radiator, an electrical component, and a battery module through which the coolant circulates. The condenser is connected to the radiator through a first line for flowing the coolant and is connected to a heater core through a second line for flowing the coolant, the evaporator is connected to the radiator through a third line for flowing the coolant and is connected to a cabin cooler through a fourth line for flowing the coolant, and the chiller is connected to the electrical component through a fifth line for flowing the coolant and is connected to the battery module through a sixth line for flowing the coolant. The gas injection device includes a gas-liquid separator configured to separate and selectively discharge a gaseous refrigerant and a liquid refrigerant from the refrigerant, wherein the refrigerant is interiorly introduced, a supply portion connected to the condenser through the refrigerant line and configured to receive the refrigerant supplied from the condenser, a first expansion valve connected to the second refrigerant connection line, provided between the gas-liquid separator and the supply portion, and configured to selectively expand the refrigerant supplied to the second refrigerant connection line or the refrigerant supplied to the supply portion and to supply the expanded refrigerant to the gas-liquid separator, a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller, a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator, a discharge portion connecting the gas-liquid separator to the second expansion valve and the third expansion valve and configured to discharge the refrigerant from the gas-liquid separator to the second expansion valve or the third expansion valve, and a supply line connecting the gas-liquid separator to the compressor and configured to selectively supply the gaseous refrigerant from the gas-liquid separator to the compressor.

The first line is configured to be selectively opened to supply the coolant to the condenser in a cooling mode and a heating mode of the vehicle, and the second line is configured to be opened to connect the condenser to the heater core in a heating mode of the vehicle.

In a case in which an ambient air heat is to be recollected in a heating mode of the vehicle, the third line is configured to be opened to connect the radiator to the evaporator.

The fourth line is configured to be opened to connect the evaporator to the cabin cooler in a cooling mode of the vehicle.

In a case in which waste heat of the electrical component is to be recollected in a heating mode of the vehicle, the fifth line is configured to be opened to connect the chiller to the electrical component.

In a case in which the battery module is to be cooled in a cooling mode of the vehicle, or in a case in which waste heat of the battery module is to be recollected in a heating mode of the vehicle, the sixth line is configured to be opened to connect the chiller to the battery module.

As described above, according to a heat pump system for a vehicle according to an embodiment, cooling and heating performance may be improved by applying a gas injection device selectively operating in an air conditioning mode of a vehicle interior to increase the flow rate of the refrigerant.

In addition, according to embodiments of the present disclosure, performance of the system may be maximized by using the gas injection device while minimizing the number of required components, and thus streamlining and simplification of the system may be achieved.

In addition, according to an embodiment, it is possible to reduce manufacturing cost and weight through simplification of an entire system and to improve space utilization.

Figure 1:
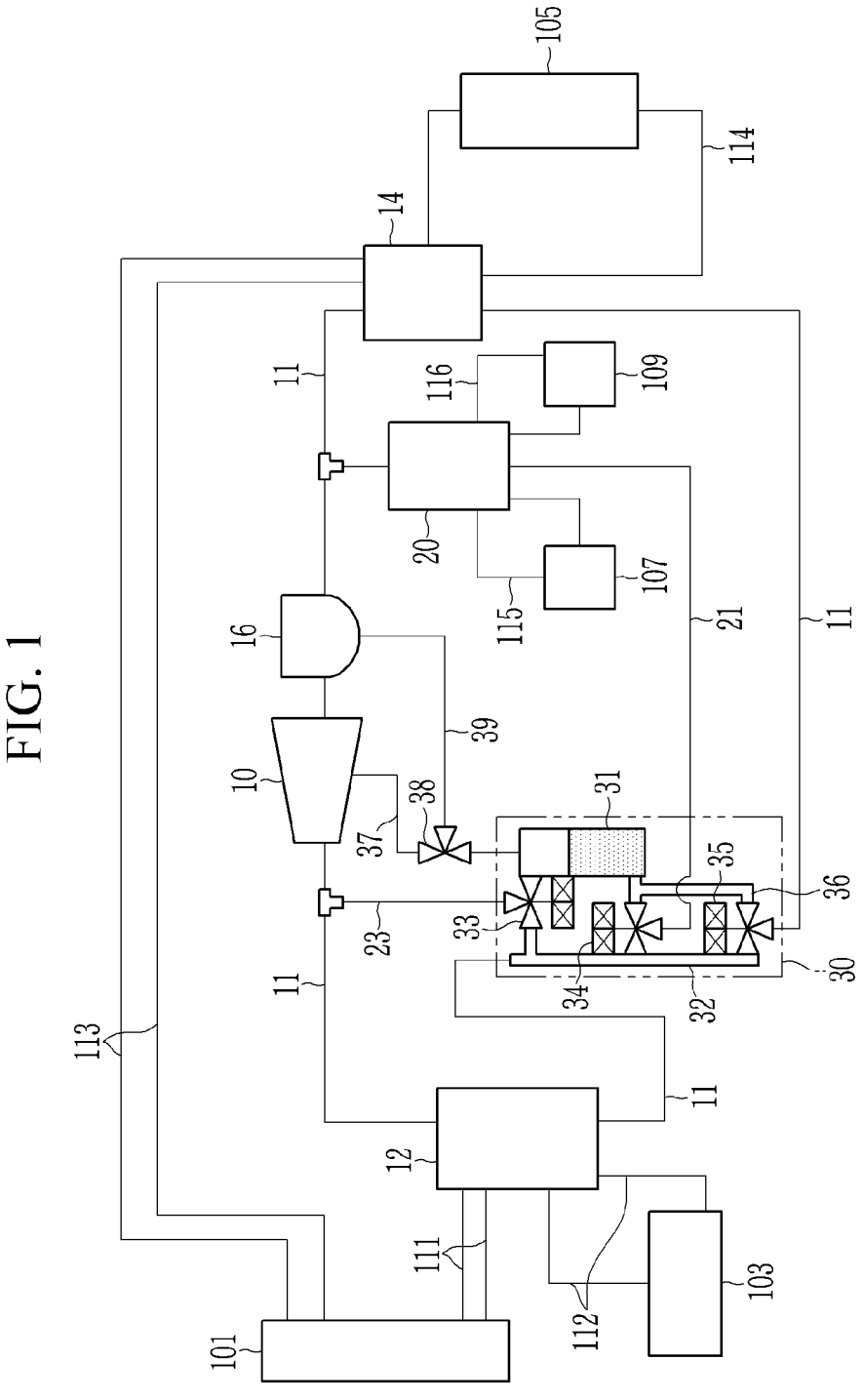
FIG. 1 is a block diagram of a heat pump system of a vehicle according to an embodiment.

DETAILED DESCRIPTION OF ILLUSTRATIVE
EMBODIMENTS

Exemplary embodiments of the present disclosure will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc. are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

FIG. 1 is a block diagram of a heat pump system of a vehicle according to an embodiment.

A heat pump system for a vehicle according to an embodiment may improve cooling and heating performance in a cooling mode or a heating mode by employing a gas injection device 30 selectively operating in an air conditioning mode of a vehicle interior.

Here, in the heat pump system of an electric vehicle, a cooling apparatus circulating a coolant may be interconnected with an air conditioner unit that is an air-conditioner apparatus for cooling and heating the vehicle interior.

That is, referring to FIG. 1, the heat pump system may include the cooling apparatus, a compressor 10, a condenser 12, an evaporator 14, a chiller 20, a first refrigerant connection line 21, a second refrigerant connection line 23, and the air conditioner unit provided with the gas injection device 30.

First, the cooling apparatus may include a radiator 101, an electrical component 107, and a battery module 109 that are connected by a coolant line through which the coolant circulates.

The radiator 101 is disposed at the front of the vehicle. A cooling fan (not shown) is provided at the rear of the radiator 101. Accordingly, the radiator 101 may cool the coolant through an operation of the cooling fan and heat-exchange with the ambient air.

Here, the radiator 101 may be connected to the condenser 12 through a first line 111 flowing the coolant and connected to the evaporator 14 through a third line 113 flowing the coolant.

In addition, the condenser 12 may be connected to a heater core 103 through a second line 112 flowing the coolant. Accordingly, the coolant heated through heat-exchange with the refrigerant at the condenser 12 may be supplied to the heater core 103 through the second line 112 in the heating mode of the vehicle.

A high temperature coolant supplied to the heater core 103 may heat (i.e., increase the temperature of) an ambient air passing through the heater core 103 to be drawn to the vehicle interior. That is, the drawn ambient air is converted to a high temperature state while passing through the heater core 103 and is then introduced to the vehicle interior, thereby realizing heating of the vehicle interior.

Here, the first line 111 may be selectively opened to supply the coolant to the condenser 12 in the cooling mode and the heating mode of the vehicle.

In addition, the second line 112 may be opened to connect the condenser 12 to the heater core 103 in the heating mode of the vehicle.

In addition, when ambient air heat is to be recollected in the heating mode of the vehicle, the third line 113 may be opened to connect the radiator 101 to the evaporator 14.

In addition, the evaporator 14 may be connected to a cabin cooler 105 through a fourth line 114 flowing the coolant. Accordingly, the coolant cooled at the evaporator 14 through heat-exchange with the refrigerant may be supplied to the cabin cooler 105 through the fourth line 114 in the cooling mode of the vehicle.

Then, the ambient air passing through the cabin cooler 105 is cooled while passing through the cabin cooler 105 by the low temperature coolant supplied to the cabin cooler 105. The cooled ambient air may be drawn into the vehicle interior to cool the vehicle interior.

That is, the fourth line 114 may be opened to connect the evaporator 14 to the cabin cooler 105 in the cooling mode of the vehicle.

Meanwhile, the electrical component 107 may be connected to the chiller 20 through a fifth line 115 flowing coolant, and the battery module 109 may be connected to the chiller 20 through a sixth line 116 flowing the coolant.

Here, when a waste heat of the electrical component 107 is to be recollected in the heating mode of the vehicle, the fifth line 115 may be opened to connect the chiller 20 to the electrical component 107.

In addition, when the battery module 109 is to be cooled in the cooling mode of the vehicle, or when a waste heat of the battery module 109 is to be recollected in the heating mode of the vehicle, the sixth line 116 may be opened to connect the chiller 20 to the battery module 109.

Here, the coolant may be selectively circulated through the first, second, third, fourth, fifth, and sixth lines 111, 112, 113, 114, 115, and 116 by an operation of a water pump (not shown).

Meanwhile, the electrical component 107 may include an electric power control unit (EPCU), a motor, an inverter, an on-board charger (OBC), or an autonomous driving controller, or the like.

The electric power control apparatus, the inverter, the motor, or the autonomous driving controller may generate heat while the vehicle is being driven, and the charger may generate heat when charging the battery module 109.

That is, when the waste heat of the electrical component 107 is to be recollected in the heating mode of the vehicle, heat generated from the electric power control apparatus, the motor, the inverter, the charger, or the autonomous driving controller may be recollected.

In the present embodiment, the compressor 10 may compress the supplied refrigerant. The condenser 12 may be connected to the compressor 10 through a refrigerant line 11.

The condenser 12 may condense the refrigerant by heat-exchanging the refrigerant supplied from the compressor 10 with the coolant supplied from the radiator 101 through the first line 111.

The evaporator 14 is connected to the condenser 12 through the refrigerant line 11. The evaporator 14 may evaporate the refrigerant by heat-exchanging the refrigerant supplied from the condenser 12 through the gas injection device 30 with the coolant supplied from the cabin cooler 105.

In addition, when the ambient air heat is to be recollected in the heating mode of the vehicle, the evaporator 14 may recollect the ambient air heat and evaporate the refrigerant while heat-exchanging the coolant supplied from the radiator 101 through the third line 113 with the refrigerant.

Meanwhile, the heat pump system may further include an accumulator 16.

The accumulator 16 may be provided on the refrigerant line 11 between the evaporator 14 and the compressor 10.

The accumulator 16 only supplies a gaseous refrigerant to the compressor 10, thereby enhancing efficiency and durability of the compressor 10.

In the present embodiment, a first end of the first refrigerant connection line 21 may be connected to the refrigerant line 11 between the compressor 10 and the evaporator 14. A second end of the first refrigerant connection line 21 is connected to the gas injection device 30.

The chiller 20 is provided on the first refrigerant connection line 21. Through either or both of the fifth line 115 and the sixth line 116, the coolant may be selectively circulated through the chiller 20.

That is, the chiller 20 may be a water-cooled heat-exchanger through which the coolant flows.

Accordingly, the chiller 20 may adjust the temperature of the coolant by heat-exchanging the refrigerant introduced through the first refrigerant connection line 21 with selectively introduced coolant from either or both of the fifth line 115 and the sixth line 116.

In addition, a first end of the second refrigerant connection line 23 may be connected to the refrigerant line 11 between the compressor 10 and the condenser 12. A second end of the second refrigerant connection line 23 may be connected to the gas injection device 30.

In addition, the gas injection device 30 may be provided on the refrigerant line 11 between the condenser 12 and the evaporator 14.

The gas injection device 30 may selectively expand and flow the refrigerant supplied from the condenser 12 and selectively supply a portion of the supplied refrigerant to the compressor 10 to increase the flow rate of the refrigerant circulating through the refrigerant line 11.

The gas injection device 30 may be selectively operated in the cooling mode, the heating mode, or a dehumidification mode of the vehicle.

Here, the gas injection device 30 includes a gas-liquid separator 31, a supply portion 32, a first expansion valve 33, a second expansion valve 34, a third expansion valve 35, and a first supply line 37.

First, the gas-liquid separator 31 may separate and selectively discharge a gaseous refrigerant and a liquid refrigerant from an interiorly introduced refrigerant.

The supply portion 32 may be connected to the condenser 12 through the refrigerant line 11 to receive the refrigerant supplied from the condenser 12.

In the present embodiment, the first expansion valve 33 may be connected to the second refrigerant connection line 23. The first expansion valve 33 may be provided between the gas-liquid separator 31 and the supply portion 32 and configured to selectively expand the refrigerant supplied to the second refrigerant connection line 23 or the supply portion 32 and supply the expanded refrigerant to the gas-liquid separator 31.

The second expansion valve 34 may be provided between the gas-liquid separator 31 and the supply portion 32 and configured to selectively expand the refrigerant supplied to the supply portion 32 and supply the expanded refrigerant to the chiller 20 or to supply the refrigerant supplied from the gas-liquid separator 31 to the chiller 20.

The third expansion valve 35 may be provided between the gas-liquid separator 31 and the supply portion 32 and configured to selectively expand the refrigerant supplied to the supply portion 32 and supply the expanded refrigerant to the evaporator 14 or to supply the refrigerant supplied from the gas-liquid separator 31 to the evaporator 14.

Here, the first, second, and third expansion valves 33, 34, and 35 may be selectively operated in the air conditioning mode of the vehicle including the cooling mode, the heating mode, and the dehumidification mode, and may selectively expand the refrigerant while controlling flowing of the refrigerant supplied to the gas injection device 30.

That is, each of the first expansion valve 33, the second expansion valve 34, and the third expansion valve 35 may be a 3-way electronic expansion valve having two inlets and one outlet and configured to selectively expand the refrigerant while controlling flowing of the refrigerant.

In the present embodiment, the discharge portion 36 may connect the gas-liquid separator 31 to the second expansion valve 34 and the third expansion valve 35 and may be configured to discharge the refrigerant from the gas-liquid separator 31 to the second expansion valve 34 or the third expansion valve 35.

Here, the second expansion valve 34 and the third expansion valve 35 may be disposed in parallel with the first expansion valve 33 through the supply portion 32 and the discharge portion 36.

In addition, the first supply line 37 connects the gas-liquid separator 31 to the compressor 10. When the refrigerant is supplied to the gas-liquid separator 31, the first supply line 37 may selectively supply the gaseous refrigerant from the gas-liquid separator 31 to the compressor 10.

That is, the first supply line 37 may connect the gas-liquid separator 31 to the compressor 10 such that the gaseous refrigerant separated by the gas-liquid separator 31 may selectively flow into the compressor 10.

Here, the gas injection device 30 may further include a control valve 38 and a second supply line 39.

First, the control valve 38 is provided on the first supply line 37 between the compressor 10 and the gas-liquid separator 31.

The control valve 38 may be a 3-way valve capable of distributing flow rates while controlling flowing of the refrigerant.

In addition, a first end of the second supply line 39 may be connected to the control valve 38. A second end of the second supply line 39 may be connected to the accumulator 16.

The gas-liquid separator 31 in the gas injection device 30 may be operated when the first expansion valve 33 expands the refrigerant in the air conditioning mode of the vehicle.

That is, when the first expansion valve 33 expands the refrigerant and supplies the expanded refrigerant to the gas-liquid separator 31, the gas-liquid separator 31 may supply the gaseous refrigerant, among the supplied refrigerant, to the compressor 10 through the supply line 37 to increase the flow rate of the refrigerant circulating through the refrigerant line 11.

An operation and action of a heat pump system according to an embodiment will be described in detail with reference to FIG. 2 to FIG. 7.

First, the operation of a heat pump system for a vehicle according to an embodiment in the case that the gas-liquid separator 31 is operated and the battery module 109 is to be cooled in the cooling mode of the vehicle is described with reference to FIG. 2.

Figure 2:
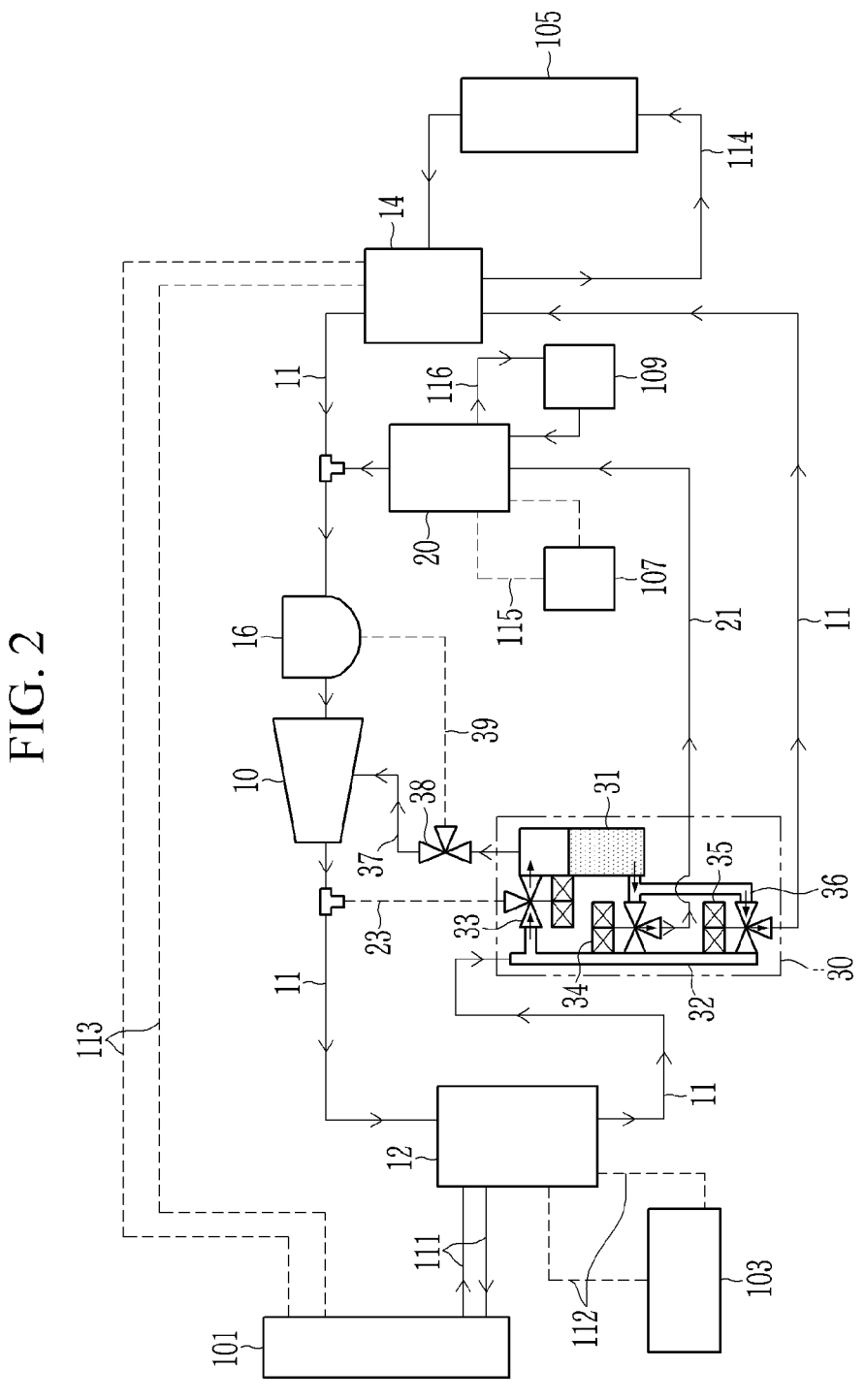
FIG. 2 is an operation diagram of a heat pump system for a vehicle according to an embodiment in the case that a gas-liquid separator is operated in a cooling mode of the vehicle and a battery module is to be cooled.

FIG. 2 is an operation diagram of a heat pump system for a vehicle according to an embodiment in the case that a gas-liquid separator is operated in the cooling mode of the vehicle and a battery module is to be cooled.

Referring to FIG. 2, the second refrigerant connection line 23 may be closed by an operation of the first expansion valve 33.

In such a state, the first expansion valve 33 may expand the refrigerant supplied through the supply portion 32 and supply the expanded refrigerant to the gas-liquid separator 31.

Here, the first supply line 37 is opened by an operation of the control valve 38. At the same time, the second supply line 39 is closed by the operation of the control valve 38.

Accordingly, the gas-liquid separator 31 may supply the gaseous refrigerant, among the interiorly introduced refrigerant, to the compressor 10 through the opened first supply line 37.

That is, the gas injection device 30 may increase the flow rate of the refrigerant circulating through the refrigerant line 11 by returning the gaseous refrigerant separated while passing through the gas-liquid separator 31 back to the compressor 10 through the first supply line 37.

Simultaneously, the second expansion valve 34 may expand the refrigerant supplied from the gas-liquid separator 31 through the discharge portion 36 and flow the expanded refrigerant to the first refrigerant connection line 21 connected to the chiller 20.

The refrigerant introduced through the first refrigerant connection line 21 may flow into the chiller 20. The refrigerant introduced to the chiller 20 may cool the coolant while being heat-exchanged with the coolant supplied from the battery module 109 through the sixth line 116.

The coolant cooled at the chiller 20 is supplied to the battery module 109 along the sixth line 116. Accordingly, the battery module 106 may be efficiently cooled by the coolant cooled at the chiller 20.

That is, the coolant circulating through the sixth line 116 may efficiently cool the battery module 109 while repeatedly performing the above-described operation.

In addition, the third expansion valve 35 may expand the refrigerant supplied from the gas-liquid separator 31 through the discharge portion 36 and flow the expanded refrigerant to the refrigerant line 11.

That is, the liquid refrigerant stored in the gas-liquid separator 31 may flow into the chiller 20 along the refrigerant connection line 21 in an expanded state through an operation of the second expansion valve 34.

In addition, the liquid refrigerant stored in the gas-liquid separator 31 may flow into the evaporator 14 along the refrigerant line 11 in an expanded state through an operation of the third expansion valve 35.

The refrigerant introduced to the evaporator 14 may be evaporated through heat-exchange with the coolant supplied from the cabin cooler 105 through the fourth line 114.

Here, the ambient air drawn into the vehicle interior is cooled by heat-exchange with the coolant in a low temperature state drawn into the cabin cooler 105. Therefore, the cooled ambient air may cool the vehicle interior by being directly drawn into the vehicle interior.

Here, the ambient air drawn into the vehicle interior is cooled by heat-exchange with the coolant in a low temperature state drawn into the cabin cooler 105. Therefore, the cooled ambient air may cool the vehicle interior by being directly drawn into the vehicle interior.

Meanwhile, the refrigerants having passed through the evaporator 14 and the chiller 20, respectively, flow to the accumulator 16. Thereafter, the refrigerant may flow into the compressor 10 after passing through the accumulator 16.

That is, the refrigerant having passed through the accumulator 16 and the refrigerant supplied from the gas-liquid separator 31 through the first supply line 37 may be introduced into the compressor 10. The introduced refrigerant may be compressed by an operation of the compressor 10.

The refrigerant compressed at the compressor 10 is supplied to the condenser 12. At this time, the condenser 12 may condense the refrigerant by using the coolant supplied from the radiator 101 through the opened first line 111.

The refrigerant condensed at the condenser 12 may be supplied to the gas injection device 30.

The heat pump system according to an embodiment may increase the flow rate of the refrigerant flowing along the refrigerant line 11 while repeatedly performing the above-described operation.

In addition, the heat pump system may improve overall cooling performance and efficiency and efficiently cool the vehicle interior by increasing the flow rate of the refrigerant flowing along the refrigerant line 11.

Simultaneously, the heat pump system may efficiently cool the battery module 109 by using the low temperature coolant cooled at the chiller 20.

An operation of a heat pump system for a vehicle according to an embodiment in the case that the gas-liquid separator 31 is operated in the heating mode of the vehicle and the ambient air heat, the waste heat of the electrical component 107, and the waste heat of the battery module 109 are to be recollected is described with reference to FIG. 3.

Figure 3:
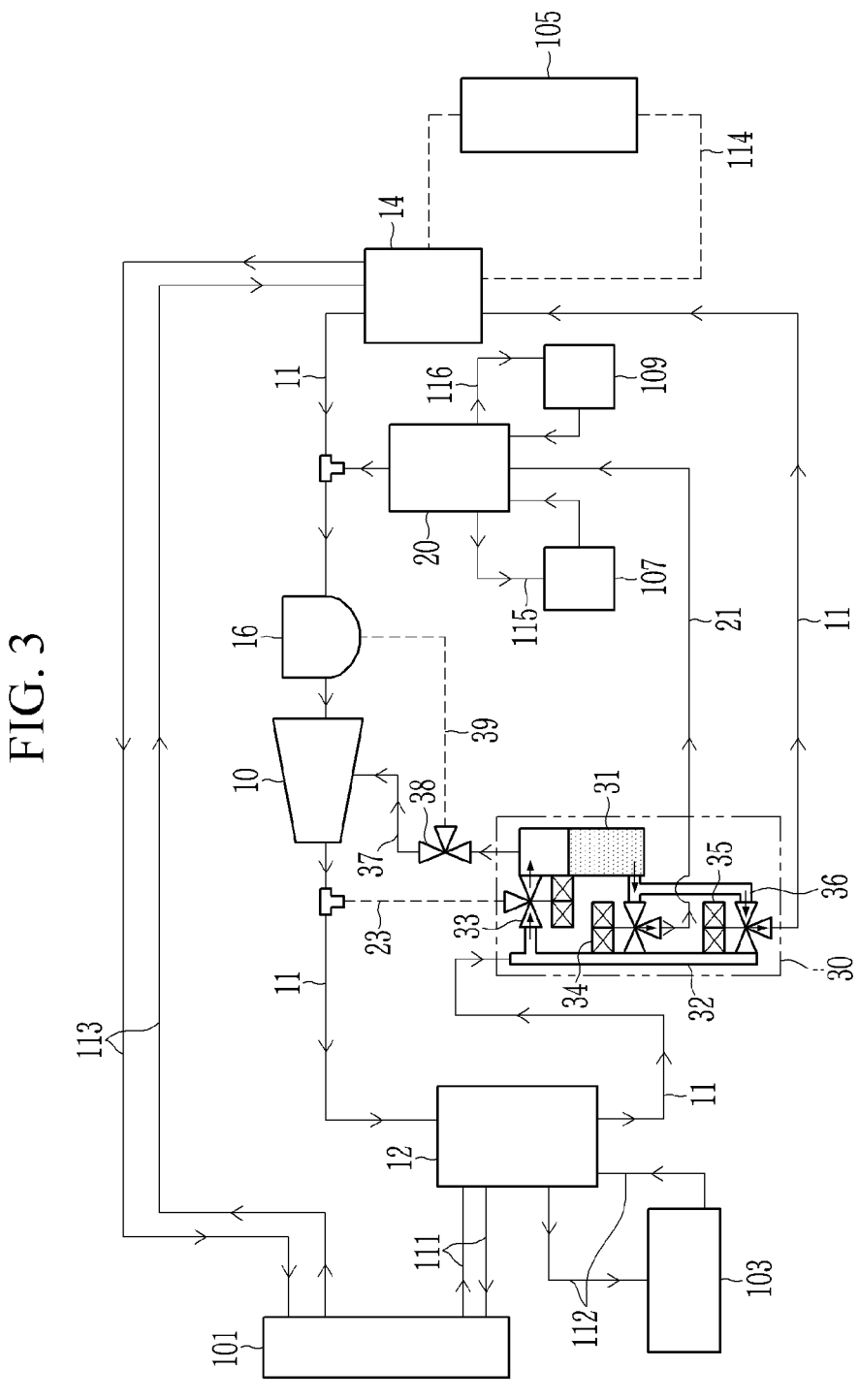
FIG. 3 is an operation diagram of a heat pump system for a vehicle according to an embodiment in the case that a gas-liquid separator is operated in a heating mode of the vehicle, and ambient air heat, waste heat of an electrical component, and waste heat of a battery module are to be recollected.

FIG. 3 is an operation diagram of a heat pump system for a vehicle according to an embodiment in the case that a gas-liquid separator is operated in the heating mode of the vehicle and the ambient air heat, waste heat of an electrical component, and waste heat of a battery module are to be recollected.

Referring to FIG. 3, the heat pump system may absorb the ambient air heat from the ambient air as well as the waste heat of the electrical component 107 and the waste heat of the battery module 109 in a state that the gas-liquid separator 31 is operated.

That is, when the gas injection device 30 is operated in the heating mode of the vehicle, the second refrigerant connection line 23 is closed by the operation of the first expansion valve 33.

In such a state, the first expansion valve 33 may expand the refrigerant supplied through the supply portion 32 and supply the expanded refrigerant to the gas-liquid separator 31.

Here, the first supply line 37 is opened by the operation of the control valve 38. At the same time, the second supply line 39 is closed by the operation of the control valve 38.

Accordingly, the gas-liquid separator 31 may supply the gaseous refrigerant, among the interiorly introduced refrigerant, to the compressor 10 through the opened first supply line 37.

That is, the gas injection device 30 may increase the flow rate of the refrigerant circulating through the refrigerant line 11 by returning the gaseous refrigerant separated while passing through the gas-liquid separator 31 back to the compressor 10 through the first supply line 37.

Simultaneously, the second expansion valve 34 may expand the refrigerant supplied from the gas-liquid separator 31 through the discharge portion 36 and flow the expanded refrigerant to the first refrigerant connection line 21 connected to the chiller 20.

The refrigerant introduced through the first refrigerant connection line 21 may flow into the chiller 20. The refrigerant introduced to the chiller 20 may cool the coolant while being heat-exchanged with the coolant supplied from the electrical component 107 through the fifth line 115 and the coolant supplied from the battery module 109 through the sixth line 116.

At this time, the coolant may be heated by recollecting waste heat from the electrical component 107 and the battery module 109 while cooling the electrical component 107 and the battery module 109. The coolant heated through such an operation may be supplied to the chiller 20.

Here, the chiller 20 may recollect the waste heat of the electrical component 107 and the battery module 109 while heat-exchanging the refrigerant with the coolant supplied from the electrical component 107 and the battery module 109 through the fifth line 115 and the sixth line 116.

In addition, the third expansion valve 35 may expand the refrigerant supplied from the gas-liquid separator 31 through the discharge portion 36 and flow the expanded refrigerant to the refrigerant line 11.

That is, the liquid refrigerant stored in the gas-liquid separator 31 may flow into the chiller 20 along the first refrigerant connection line 21 in the expanded state through the operation of the second expansion valve 34.

In addition, the liquid refrigerant stored in the gas-liquid separator 31 may flow to the evaporator 14 along the refrigerant line 11 in the expanded state through the operation of the third expansion valve 35.

The refrigerant introduced to the evaporator 14 may be evaporated through heat-exchange with the coolant supplied from the radiator 101 through the third line 113.

At this time, the coolant supplied to the evaporator 14 may be heated by absorbing the ambient air heat while passing through the radiator 101. The coolant heated through such an operation may be supplied to the evaporator 14.

Here, the evaporator 14 may recollect the ambient air heat while heat-exchanging the supplied coolant and refrigerant.

Meanwhile, the refrigerants having passed through the evaporator 14 and the chiller 20, respectively, flow to the accumulator 16. Thereafter, the refrigerant may flow into the compressor 10 after passing through the accumulator 16.

That is, the refrigerant having passed through the accumulator 16 and the refrigerant supplied from the gas-liquid separator 31 through the first supply line 37 may be introduced into the compressor 10. The introduced refrigerant may be compressed by the operation of the compressor 10.

The refrigerant compressed at the compressor 10 is supplied to the condenser 12. At this time, the condenser 12 may condense the refrigerant by using the coolant supplied from the radiator 101 through the opened first line 111.

In addition, the refrigerant introduced to the condenser 12 may be condensed while being heat-exchanged with the coolant supplied from the heater core 103 through the second line 112.

Accordingly, the coolant heated through heat-exchange with the refrigerant at the condenser 12 may be supplied to the heater core 103.

In addition, the refrigerant condensed at the condenser 12 may be supplied to the gas injection device 30.

Here, the ambient air drawn into the vehicle interior is converted to the high temperature state through heat-exchange with the coolant in the high temperature state drawn into the heater core 103 and then introduced to the vehicle interior, thereby realizing heating of the vehicle interior.

Accordingly, the refrigerant circulated by the heat pump system may recollect the ambient air heat at the evaporator 14 and smoothly recollect waste heat from the coolant heated while flowing from the chiller 20 to pass through the electrical component 107 and the battery module 109, thereby enhancing overall heating performance and efficiency.

In addition, embodiments of the present disclosure may enhance the heating efficiency and performance while minimizing the use of a separate electric heater.

In addition, heating performance may be maximized by increasing the flow rate of the refrigerant circulating through the refrigerant line 11 by the gas injection device 30.

Meanwhile, it is described that the ambient air heat and the waste heat of the electrical component 107 and the battery module 109 are recollected together in the present exemplary embodiment, but it is not limited thereto, and at least one of the ambient air heat and the waste heat of the electrical component 107 or the waste heat of the battery module 109 may be selectively recollected.

An operation of a heat pump system for a vehicle according to an embodiment in the case that the gas-liquid separator 31 is not operated in the cooling mode of the vehicle is described with reference to FIG. 4.

Figure 4:
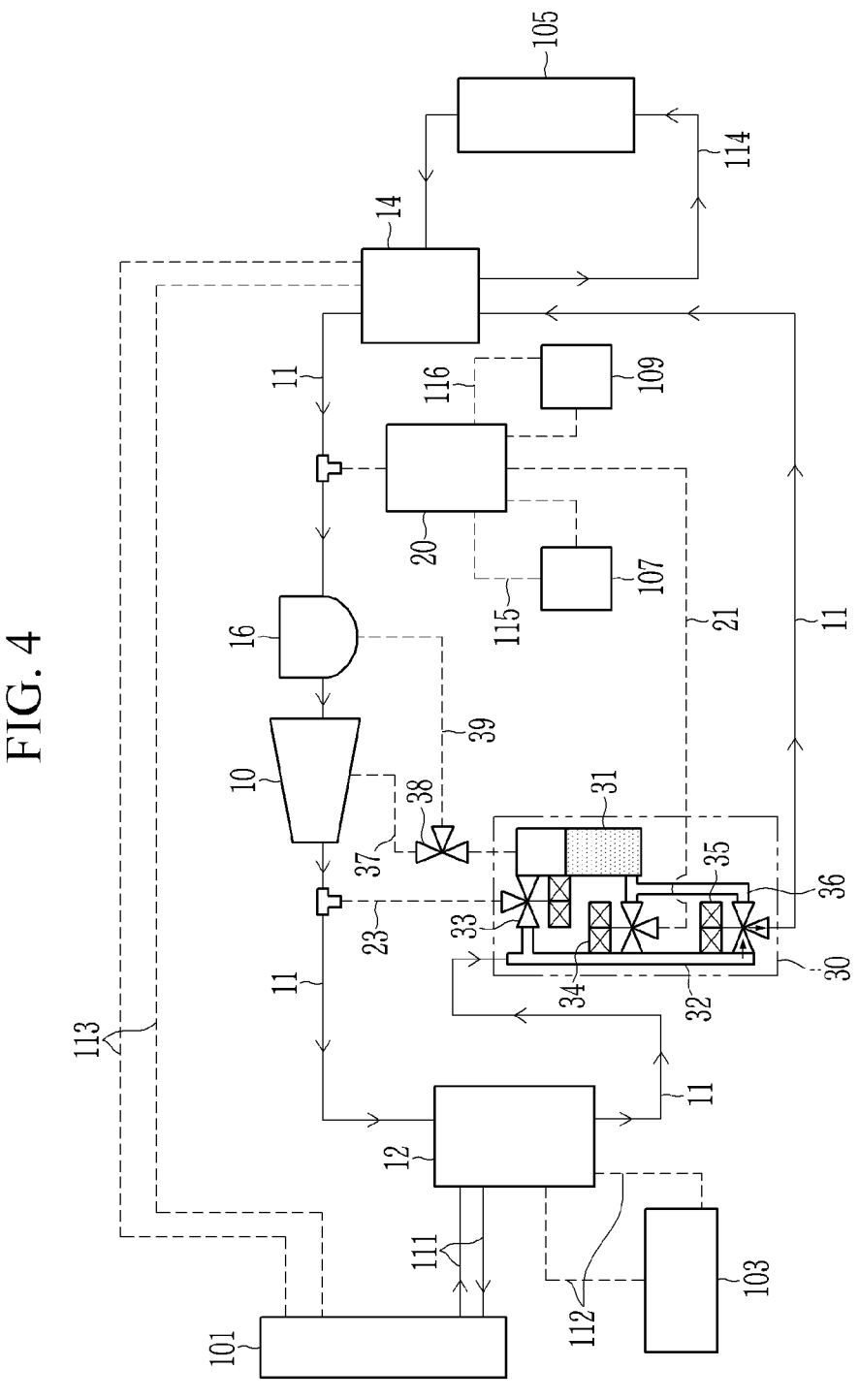
FIG. 4 is an operation diagram of a heat pump system for a vehicle according to an embodiment in the case that a gas-liquid separator is not operated in a cooling mode of the vehicle.

FIG. 4 is an operation diagram of a heat pump system for a vehicle according to an embodiment in the case that a gas-liquid separator is not operated in the cooling mode of the vehicle.

Referring to FIG. 4, when an operation of the gas-liquid separator 31 is not required in the cooling mode of the vehicle, the second refrigerant connection line 23 is closed by the operation of the first expansion valve 33.

In addition, the first expansion valve 33 and the second expansion valve 34 stop operating.

Accordingly, flowing of the refrigerant to the gas-liquid separator 31 may be blocked. At the same time, the first supply line 37 and the second supply line 39 may be closed by the operation of the control valve 38.

In addition, the third expansion valve 35 may expand the refrigerant supplied from the condenser 12 through the supply portion 32 and flow the expanded refrigerant to the refrigerant line 11.

That is, the refrigerant introduced through the supply portion 32 may flow to the evaporator 14 along the refrigerant line 11 in the expanded state through the operation of the third expansion valve 35.

The refrigerant introduced to the evaporator 14 may be evaporated through heat-exchange with the coolant supplied from the cabin cooler 105 through the fourth line 114.

Here, the ambient air drawn into the vehicle interior is cooled by heat-exchange with the coolant in a low temperature state drawn into the cabin cooler 105. Therefore, the cooled ambient air may cool the vehicle interior by being directly drawn into the vehicle interior.

Meanwhile, the refrigerant having passed through the evaporator 14 is drawn into the accumulator 16. Thereafter, the refrigerant may flow into the compressor 10 after passing through the accumulator 16.

That is, the refrigerant having passed through the accumulator 16 may flow into the compressor 10. The introduced refrigerant may be compressed by the operation of the compressor 10.

The refrigerant compressed at the compressor 10 is supplied to the condenser 12. At this time, the condenser 12 may condense the refrigerant by using the coolant supplied from the radiator 101 through the opened first line 111.

The refrigerant condensed at the condenser 12 may be supplied to the supply portion 32 provided in the gas injection device 30.

The heat pump system according to an embodiment may efficiently cool the vehicle interior while repeatedly performing the above-described processes.

An operation of a heat pump system for a vehicle according to an embodiment in the case that the gas-liquid separator 31 is not operated in the heating mode of the vehicle and the ambient air heat and the waste heat of the electrical component 107 are to be recollected is described with reference to FIG. 5.

Figure 5:
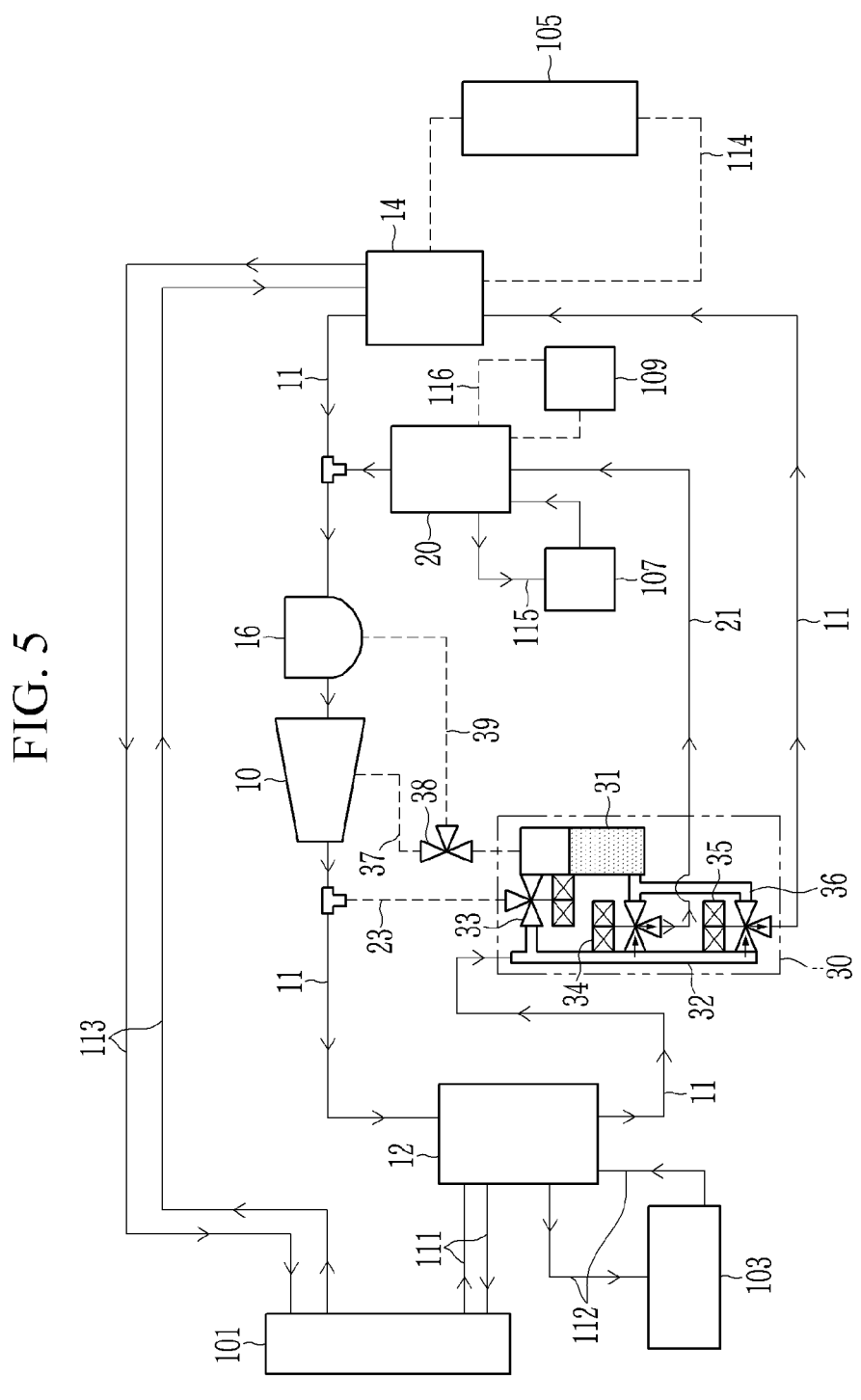
FIG. 5 is an operation diagram of a heat pump system for a vehicle according to an embodiment in the case that a gas-liquid separator is not operated in a heating mode of the vehicle and ambient air heat and waste heat of an electrical component are to be recollected.

FIG. 5 is an operation diagram of a heat pump system for a vehicle according to an embodiment in the case that a gas-liquid separator is not operated in a heating mode of the vehicle and the ambient air heat and waste heat of an electrical component are to be recollected.

Referring to FIG. 5, the heat pump system may absorb the ambient air heat from the ambient air as well as the waste heat of the electrical component 107 in a state that the gas-liquid separator 31 is not operated.

That is, when the gas-liquid separator 31 is not operated in the heating mode of the vehicle, the second refrigerant connection line 23 is closed by the operation of the first expansion valve 33.

Simultaneously, the first expansion valve 33 stops operating. Then, flowing of the refrigerant to the gas-liquid separator 31 may be blocked.

By such an operation, the refrigerant may not flow into the gas-liquid separator 31. Meanwhile, the first supply line 37 and the second supply line 39 may be closed by the operation of the control valve 38.

In addition, the second expansion valve 34 may expand the refrigerant supplied through the supply portion 32 and flow the expanded refrigerant to the first refrigerant connection line 21 connected to the chiller 20.

The refrigerant introduced through the first refrigerant connection line 21 may flow into the chiller 20. The refrigerant introduced to the chiller 20 may cool the coolant while being heat-exchanged with the coolant supplied from the electrical component 107 through the fifth line 115.

At this time, the coolant may be heated by recollecting waste heat from the electrical component 107 while cooling the electrical component 107. The coolant heated through such an operation may be supplied to the chiller 20.

Here, the chiller 20 may recollect the waste heat of the electrical component 107 while heat-exchanging the coolant supplied from the electrical component 107 through the fifth line 115 with the refrigerant.

In addition, the third expansion valve 35 may expand the refrigerant supplied through the supply portion 32 and flow the expanded refrigerant to the refrigerant line 11.

That is, the refrigerant introduced to the supply portion 32 may flow into the chiller 20 along the first refrigerant connection line 21 in the expanded state through the operation of the second expansion valve 34.

In addition, the refrigerant introduced to the supply portion 32 may flow to the evaporator 14 along the refrigerant line 11 in the expanded state through the operation of the third expansion valve 35.

The refrigerant introduced to the evaporator 14 may be evaporated through heat-exchange with the coolant supplied from the radiator 101 through the third line 113.

At this time, the coolant supplied to the evaporator 14 may be heated by absorbing the ambient air heat while passing through the radiator 101. The coolant heated through such an operation may be supplied to the evaporator 14.

Here, the evaporator 14 may recollect the ambient air heat while heat-exchanging the supplied coolant and refrigerant.

Meanwhile, the refrigerants having passed through the evaporator 14 and the chiller 20, respectively, flow to the accumulator 16. Thereafter, the refrigerant may flow into the compressor 10 after passing through the accumulator 16.

That is, the refrigerant having passed through the accumulator 16 may flow into the compressor 10. The introduced refrigerant may be compressed by the operation of the compressor 10.

The refrigerant compressed at the compressor 10 is supplied to the condenser 12. At this time, the condenser 12 may condense the refrigerant by using the coolant supplied from the radiator 101 through the opened first line 111.

In addition, the refrigerant introduced to the condenser 12 may be condensed while being heat-exchanged with the coolant supplied from the heater core 103 through the second line 112.

Accordingly, the coolant heated through heat-exchange with the refrigerant at the condenser 12 may be supplied to the heater core 103.

In addition, the refrigerant condensed at the condenser 12 may flow into the supply portion 32.

Here, the ambient air drawn into the vehicle interior is converted to the high temperature state through heat-exchange with the coolant in the high temperature state drawn into the heater core 103 and then introduced to the vehicle interior, thereby realizing heating of the vehicle interior.

Accordingly, the refrigerant circulated by the heat pump system may recollect the ambient air heat at the evaporator 14 and smoothly recollect waste heat from the coolant heated while flowing from the chiller 20 to pass through the electrical component 107, thereby enhancing overall heating performance and efficiency.

In addition, embodiments of the present disclosure may enhance the heating efficiency and performance while minimizing the use of a separate electric heater.

Meanwhile, it is described that the ambient air heat and the waste heat of the electrical component 107 are recollected together in the present exemplary embodiment, but it is not limited thereto, and at least one of the ambient air heat, the waste heat of the electrical component 107, and the waste heat of the battery module 109 may be selectively recollected.

An operation of a heat pump system for a vehicle according to an embodiment in the case that the gas-liquid separator 31 is operated in the heating mode of the vehicle and the ambient air heat, the waste heat of the electrical component 107, and the waste heat of the battery module 109 are not to be recollected is described with reference to FIG. 6.

Figure 6:
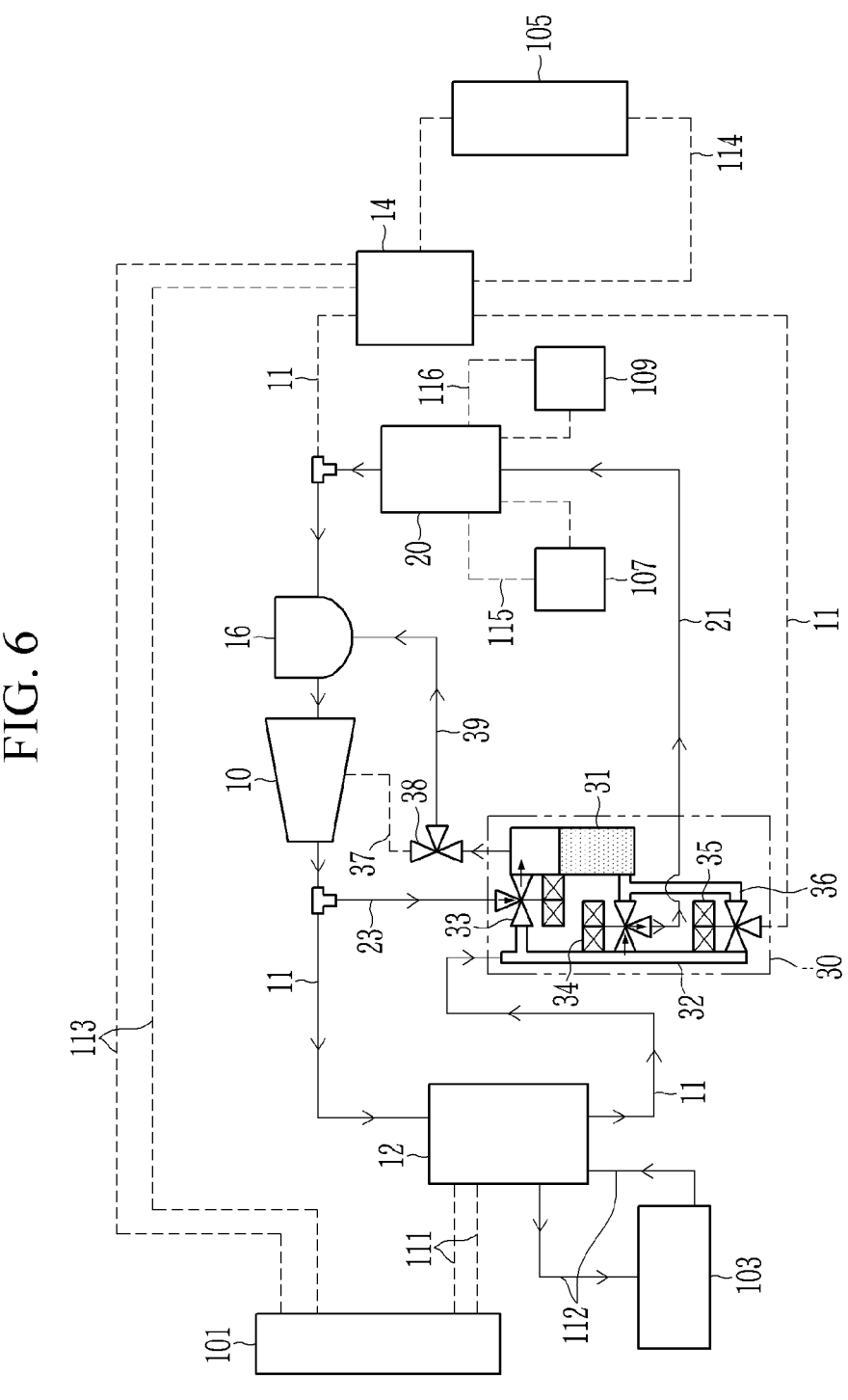
FIG. 6 is an operation diagram of a heat pump system for a vehicle according to an embodiment in the case that a gas-liquid separator is operated in a heating mode of the vehicle and heat is not to be recollected.

FIG. 6 is an operation diagram of a heat pump system for a vehicle according to an embodiment in the case that a gas-liquid separator is operated in a heating mode of the vehicle and heat is not to be recollected.

Referring to FIG. 6, when the ambient air heat, the waste heat of the electrical component 107, and the waste heat of the battery module 109 are insufficient, in a state that the gas-liquid separator 31 is operated, the heat pump system may not recollect heat.

That is, in the heat pump system, when heating of the vehicle interior is required in a state that the external temperature is low and the heat generated from the electrical component 107 and the battery module 109 is insufficient at the beginning of the vehicle operation, heating of the vehicle interior may be performed by directly using high pressure and the high temperature refrigerant.

As such, heating of the vehicle interior by using only the refrigerant may be referred to as a hot gas heating mode.

First, the second refrigerant connection line 23 may be opened by the operation of the first expansion valve 33.

Accordingly, the first expansion valve 33 may expand the refrigerant supplied through the second refrigerant connection line 23 and supply the expanded refrigerant to the gas-liquid separator 31.

Here, a part of the first supply line 37 connected to the compressor 10 with reference to the control valve 38 may be closed. In addition, the second supply line 39 may be opened by the operation of the control valve 38.

Then, the gas-liquid separator 31 may supply the gaseous refrigerant, among the interiorly introduced refrigerant, to the accumulator 16 through the opened second supply line 39.

Meanwhile, the second expansion valve 34 may expand the refrigerant supplied through the supply portion 32 and flow the expanded refrigerant to the first refrigerant connection line 21 connected to the chiller 20.

Simultaneously, the third expansion valve 35 may stop operating.

That is, the refrigerant introduced to the supply portion 32 may flow into the chiller 20 along the first refrigerant connection line 21 in the expanded state through the operation of the second expansion valve 34.

Meanwhile, the refrigerant having passed through the chiller 20, together with the refrigerant introduced through the second supply line 39, flows to the accumulator 16. Thereafter, the refrigerant may flow into the compressor 10 after passing through the accumulator 16.

That is, the refrigerant having passed through the accumulator 16 may flow into the compressor 10. The introduced refrigerant may be compressed by the operation of the compressor 10.

The refrigerant compressed at the compressor 10 is supplied to the condenser 12. At this time, the condenser 12 may condense the refrigerant by using the coolant supplied from the heater core 103 through the opened second line 112. Here, the first line 111 may be closed.

Accordingly, the coolant heated through heat-exchange with the refrigerant at the condenser 12 may be supplied to the heater core 103.

In addition, the refrigerant condensed at the condenser 12 may flow into the supply portion 32.

Here, the ambient air drawn into the vehicle interior is converted to the high temperature state through heat-exchange with the coolant in the high temperature state drawn into the heater core 103 and then introduced to the vehicle interior, thereby realizing heating of the vehicle interior.

That is, in this embodiment, when the heat source is insufficient at the beginning of vehicle operation in a state that the external temperature is low, the vehicle interior may be heated by using the high temperature refrigerant supplied from the compressor 10.

In addition, the operation of a heat pump system for a vehicle according to an embodiment in the case that the compressor 10 is warmed-up by using the gas injection device 30 is described with reference to FIG. 7.

Figure 7:
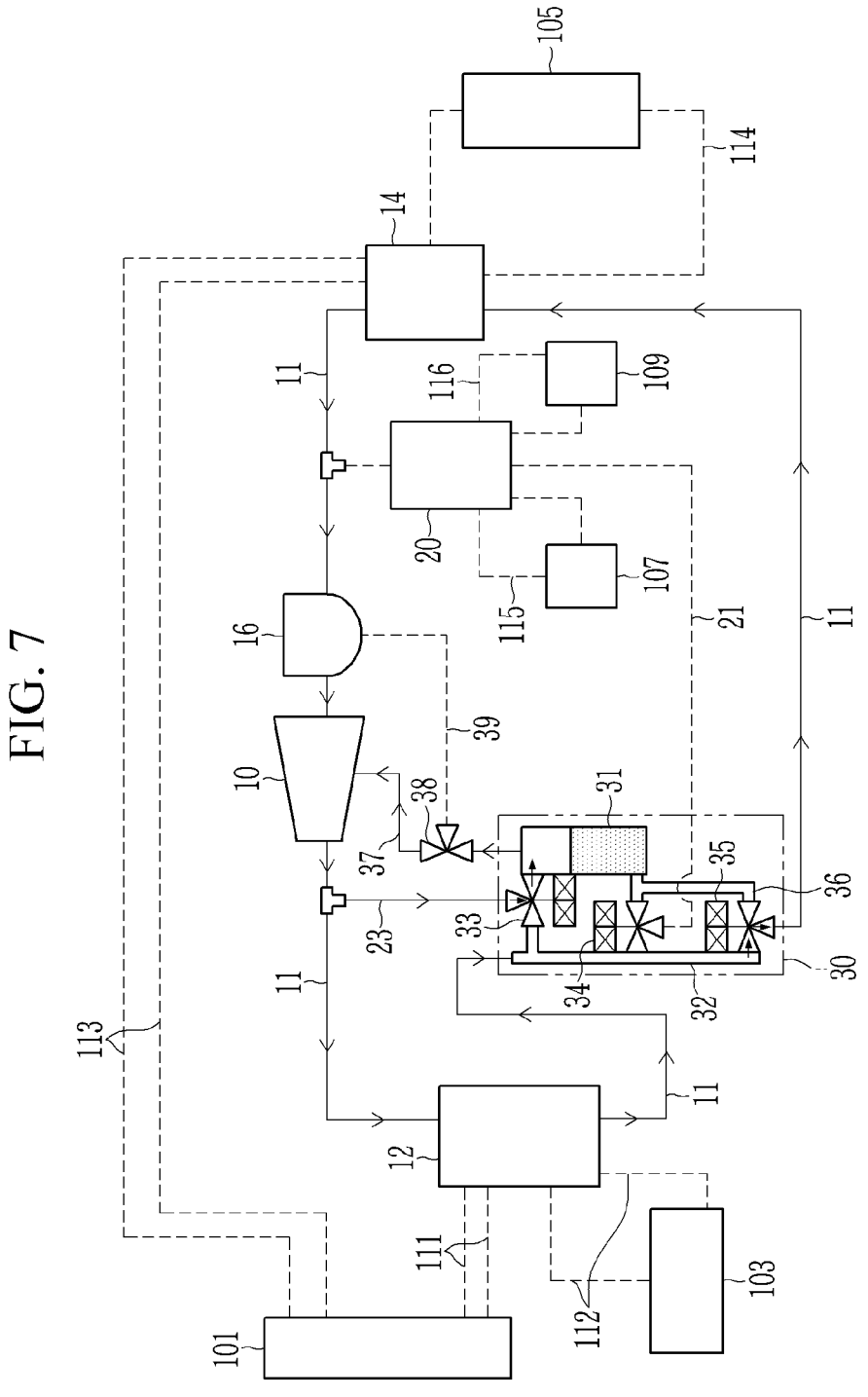
FIG. 7 is an operation diagram of a heat pump system for a vehicle according to an embodiment in the case of warming-up a compressor by using a gas injection device.

FIG. 7 is an operation diagram of a heat pump system for a vehicle according to an embodiment in the case of warming-up a compressor by using a gas injection device.

Referring to FIG. 7, when the temperature of the compressor 10 is low, the heat pump system may rapidly heat the compressor 10 to a temperature for smooth operation by supplying the high temperature refrigerant to the compressor 10 before the heating mode of the vehicle interior is operated.

First, the second refrigerant connection line 23 is opened by the operation of the first expansion valve 33.

At this time, the first expansion valve 33 may expand the refrigerant supplied through the second refrigerant connection line 23 and supply the expanded refrigerant to the gas-liquid separator 31.

That is, a partial refrigerant of the refrigerant supplied from the compressor 10 may be supplied to the second refrigerant connection line 23 in the expanded state by the first expansion valve 33, and a remaining refrigerant may flow to the condenser 12 along the refrigerant line 11.

Here, the first supply line 37 is opened by the operation of the control valve 38. At the same time, the second supply line 39 is closed by the operation of the control valve 38.

Accordingly, the gas-liquid separator 31 may supply the gaseous refrigerant, among the interiorly introduced refrigerant, to the compressor 10 through the opened first supply line 37.

That is, the gas injection device 30 may rapidly increase the temperature of the compressor 10 by returning the gaseous refrigerant separated while passing through the gas-liquid separator 31 back to the compressor 10 through the first supply line 37.

Meanwhile, the second expansion valve 34 stops operating.

In addition, the third expansion valve 35 may expand the refrigerant supplied through the supply portion 32 and flow the expanded refrigerant to the refrigerant line 11. That is, the refrigerant introduced to the supply portion 32 may flow into the evaporator 14 along the refrigerant line 11 in the expanded state through the operation of the third expansion valve 35.

The refrigerant introduced to the evaporator 14 may be supplied back to the compressor 10 after having passed through the accumulator 16 along the refrigerant line 11.

Here, the supply of the coolant to the condenser 12 and the evaporator 14 may be stopped. Accordingly, the refrigerant passing through the condenser 12 and the evaporator 14 is supplied to the compressor 10 along the refrigerant line 11 without heat-exchange with the coolant.

While repeatedly performing such an operation, the refrigerant in the high temperature state may be promptly introduced to the compressor 10. While repeatedly performing such an operation, the temperature of the compressor 10 may be more rapidly increased.

That is, when the external temperature is low at the beginning of vehicle operation, the compressor 10 may remain at the low temperature state. When the heating mode of the vehicle interior is activated in such a state, the thermal loss of the refrigerant compressed at the compressor 10 may be increased.

The thermal loss of the refrigerant may deteriorate the overall heating performance of the vehicle interior, and therefore, the heating performance of the vehicle interior may be secured by rapidly increasing the temperature of the compressor 10 through the above-described operation before the heating mode of the vehicle interior is activated.

Therefore, as described above, according to a heat pump system for a vehicle according to an embodiment, the waste heat of the electrical component 107 may be recollected and the temperature of the battery module 109 may be adjusted depending on the mode of the vehicle by using the single chiller 20 where the coolant and the refrigerant are heat-exchanged.

In addition, according to embodiments of the present disclosure, cooling and heating performance may be improved by applying the gas injection device 30 selectively operating in the air conditioning mode of the vehicle interior to increase the flow rate of the refrigerant.

In addition, according to embodiments of the present disclosure, performance of the system may be maximized by using the gas injection device while minimizing the number of required components, and thus streamlining and simplification of the system may be achieved.

In addition, according to an embodiment, by efficiently adjusting the temperature of the battery module 109, the optimal performance of the battery module 109 may be enabled, and the overall travel distance of the vehicle may be increased due to the efficient management of the battery module 109.

In addition, according to embodiments of the present disclosure, heating efficiency may be enhanced by selectively utilizing the ambient air heat, the waste heat of the electrical component 107, or the waste heat of the battery module 109 in the heating mode of the vehicle.

In addition, according to an embodiment, it is possible to reduce manufacturing cost and weight through simplification of an entire system and to improve space utilization.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The following reference identifiers may be used in connection with the drawings to describe various features of embodiments of the present disclosure.

10: compressor
11: refrigerant line
12: condenser
14: evaporator
16: accumulator
20: chiller
21: first refrigerant connection line
23: second refrigerant connection line
30: gas injection device
31: gas-liquid separator
32: supply portion
33, 34, 35: first, second, and third expansion valves
36: discharge portion
37: first supply line
38: valve
39: second supply line
101: radiator
103: heater core
105: cabin cooler
107: electrical component
109: battery module
111, 112, 113, 114, 115, 116: first, second, third, fourth, fifth, and sixth lines

What is claimed is:

1. A heat pump system for a vehicle, the heat pump system comprising:
a compressor configured to compress a refrigerant;
a condenser connected to the compressor through a refrigerant line and configured to condense the refrigerant by heat-exchanging the refrigerant supplied from the compressor with a first coolant;
an evaporator connected to the condenser through the refrigerant line and configured to evaporate the refrigerant by heat-exchanging the refrigerant supplied from the condenser with the first coolant;
a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating in the refrigerant line;
a first refrigerant connection line disposed between the compressor and the evaporator, the first refrigerant connection line having a first end connected to the refrigerant line and a second end connected to the gas injection device;
a chiller provided on the first refrigerant connection line and configured to adjust a temperature of the first coolant by heat-exchanging the refrigerant introduced through the first refrigerant connection line with a second coolant; and
a second refrigerant connection line disposed between the compressor and the condenser, the second refrigerant connection line having a first end connected to the refrigerant line and a second end connected to the gas injection device;
wherein the gas injection device comprises:
a gas-liquid separator configured to separate and selectively discharge a gaseous refrigerant and a liquid refrigerant from the refrigerant, wherein the refrigerant is internally introduced;

a supply portion connected to the condenser through the refrigerant line and configured to receive the refrigerant supplied from the condenser;
a first expansion valve connected to the second refrigerant connection line, provided between the gas-liquid separator and the supply portion, and configured to selectively expand the refrigerant supplied to the second refrigerant connection line or the refrigerant supplied to the supply portion and to supply the expanded refrigerant to the gas-liquid separator;
a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller;
a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator;
a discharge portion connecting the gas-liquid separator to the second expansion valve and the third expansion valve and configured to discharge the refrigerant from the gas-liquid separator to the second expansion valve or the third expansion valve; and
a supply line connecting the gas-liquid separator to the compressor and configured to selectively supply the gaseous refrigerant from the gas-liquid separator to the compressor.

2. The heat pump system of claim 1, wherein the second expansion valve and the third expansion valve are disposed in parallel with the first expansion valve through the supply portion and the discharge portion.

3. The heat pump system of claim 1, wherein the first, the second, and the third expansion valves are selectively operated in an air conditioning mode of the vehicle comprising a cooling mode, a heating mode, or a dehumidification mode and are configured to selectively expand the refrigerant while controlling flowing of the refrigerant supplied to the gas injection device.

4. The heat pump system of claim 1, wherein the gas-liquid separator is operated when the first expansion valve expands the refrigerant in an air conditioning mode of the vehicle, and wherein the gas-liquid separator is configured to supply the gaseous refrigerant to the compressor through the supply line to increase the flow rate of the refrigerant circulating in the refrigerant line.

5. The heat pump system of claim 1, wherein each of the first expansion valve, the second expansion valve, and the third expansion valve comprises a 3-way electronic expansion valve having two inlets and one outlet, and wherein each of the first expansion valve, the second expansion valve, and the third expansion valve is configured to selectively expand the refrigerant while controlling the flow of the refrigerant.

6. A heat pump system for a vehicle, the heat pump system comprising:
a compressor configured to compress a refrigerant;
a condenser connected to the compressor through a refrigerant line and configured to condense the refrigerant by heat-exchanging the refrigerant supplied from the compressor with a first coolant;

an evaporator connected to the condenser through the refrigerant line and configured to evaporate the refrigerant by heat-exchanging the refrigerant supplied from the condenser with the first coolant;

an accumulator provided on the refrigerant line between the evaporator and the compressor;

a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating in the refrigerant line;

a first refrigerant connection line disposed between the compressor and the evaporator, the first refrigerant connection line having a first end connected to the refrigerant line and a second end connected to the gas injection device;

a chiller provided on the first refrigerant connection line and configured to adjust a temperature of the first coolant by heat-exchanging the refrigerant introduced through the first refrigerant connection line with a second coolant; and a second refrigerant connection line disposed between the compressor and the condenser, the second refrigerant connection line having a first end connected to the refrigerant line and a second end connected to the gas injection device;

wherein the gas injection device comprises:

a gas-liquid separator configured to separate and selectively discharge a gaseous refrigerant and a liquid refrigerant from the refrigerant, wherein the refrigerant is internally introduced;

a supply portion connected to the condenser through the refrigerant line and configured to receive the refrigerant supplied from the condenser;

a first expansion valve connected to the second refrigerant connection line, provided between the gas-liquid separator and the supply portion, and configured to selectively expand the refrigerant supplied to the second refrigerant connection line or the refrigerant supplied to the supply portion and to supply the expanded refrigerant to the gas-liquid separator;

a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller;

a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator;

a discharge portion connecting the gas-liquid separator to the second expansion valve and the third expansion valve and configured to discharge the refrigerant from the gas-liquid separator to the second expansion valve or the third expansion valve;

a first supply line connecting the gas-liquid separator to the compressor and configured to selectively supply the gaseous refrigerant from the gas-liquid separator to the compressor;

a control valve provided on the first supply line; and a second supply line having a first end connected to the control valve and a second end connected to the accumulator.

7. The heat pump system of claim 6, wherein, in a case in which the gas-liquid separator is operated in a cooling mode of the vehicle and cooling of a battery module is required:

the second refrigerant connection line is configured to be closed by an operation of the first expansion valve;

the first expansion valve is configured to expand the refrigerant supplied through the supply portion and supply the expanded refrigerant to the gas-liquid separator;

the second expansion valve is configured to expand the refrigerant supplied from the gas-liquid separator through the discharge portion and flow the expanded refrigerant to the first refrigerant connection line connected to the chiller;

the third expansion valve is configured to expand the refrigerant supplied from the gas-liquid separator through the discharge portion and flow the expanded refrigerant to the refrigerant line;

the first supply line is configured to be opened by an operation of the control valve;

the second supply line is configured to be closed by the operation of the control valve; and the gas-liquid separator is configured to supply the gaseous refrigerant to the compressor through the opened first supply line.

8. The heat pump system of claim 6, wherein, in a case in which an operation of the gas-liquid separator is not required in a cooling mode of the vehicle:

the second refrigerant connection line is configured to be closed by the first expansion valve;

the first and second expansion valves are configured to stop operating;

a flow of the refrigerant to the gas-liquid separator is blocked;

the third expansion valve is configured to expand the refrigerant supplied through the supply portion and supply the expanded refrigerant to the evaporator through the refrigerant line; and the first and second supply lines are configured to be closed by an operation of the control valve.

9. The heat pump system of claim 6, wherein, in a case in which the gas-liquid separator is operated in a heating mode of the vehicle and an ambient air heat, waste heat of an electrical component, and waste heat of a battery module are to be recollected:

the second refrigerant connection line is configured to be closed by an operation of the first expansion valve;

the first expansion valve is configured to expand the refrigerant supplied through the supply portion and supply the expanded refrigerant to the gas-liquid separator;

the second expansion valve is configured to expand the refrigerant supplied from the gas-liquid separator through the discharge portion and flow the expanded refrigerant to the first refrigerant connection line connected to the chiller;

the third expansion valve is configured to expand the refrigerant supplied from the gas-liquid separator through the discharge portion and supply the expanded refrigerant to the evaporator through the refrigerant line;

the first supply line is configured to be opened by an operation of the control valve;

the second supply line is configured to be closed by the operation of the control valve; and the gas-liquid separator is configured to supply the gaseous refrigerant to the compressor through the opened first supply line.

10. The heat pump system of claim 6, wherein, in a case in which an operation of the gas-liquid separator is not required in a heating mode of the vehicle and an ambient air heat and waste heat of an electrical component are to be recollected:

the second refrigerant connection line is configured to be closed by an operation of the first expansion valve, the first expansion valve is configured to stop operating;

the second expansion valve is configured to expand the refrigerant supplied through the supply portion and flow the expanded refrigerant to the first refrigerant connection line connected to the chiller;

the third expansion valve is configured to expand the refrigerant supplied through the supply portion and supply the expanded refrigerant to the evaporator through the refrigerant line;

a flow of the refrigerant to the gas-liquid separator is blocked; and the first supply line and the second supply line are configured to be closed by an operation of the control valve.

11. The heat pump system of claim 6, wherein, in a state in which the gas-liquid separator is operated in a heating mode of the vehicle and an ambient air heat, waste heat of an electrical component, and waste heat of a battery module are not to be recollected:

the second refrigerant connection line is configured to be opened by an operation of the first expansion valve;

the first expansion valve is configured to expand the refrigerant supplied through the second refrigerant connection line and supply the expanded refrigerant to the gas-liquid separator;

the second expansion valve is configured to expand the refrigerant supplied through the supply portion and flow the expanded refrigerant to the first refrigerant connection line connected to the chiller;

the third expansion valve is configured to stop operating;

the first supply line is configured to be closed by an operation of the control valve;

the second supply line is configured to be opened by the operation of the control valve; and the gas-liquid separator is configured to supply the gaseous refrigerant to the accumulator through the opened second supply line.

12. The heat pump system of claim 6, wherein, in a case in which warming-up of the compressor is required:

the second refrigerant connection line is configured to be opened by an operation of the first expansion valve;

the first expansion valve is configured to expand the refrigerant supplied through the second refrigerant connection line and supply the expanded refrigerant to the gas-liquid separator;

the second expansion valve is configured to stop operating;

the third expansion valve is configured to expand the refrigerant supplied through the supply portion and supply the expanded refrigerant to the evaporator through the refrigerant line;

the first supply line is configured to be opened by an operation of the control valve;

the second supply line is configured to be closed by the operation of the control valve; and the gas-liquid separator is configured to supply the gaseous refrigerant to the compressor through the opened first supply line.

13. The heat pump system of claim 6, wherein the control valve comprises a 3-way valve configured to distribute flow rates while controlling flowing of the refrigerant.

14. A heat pump system for a vehicle, the heat pump system comprising:

a compressor configured to compress a refrigerant;

a condenser connected to the compressor through a refrigerant line and configured to condense the refrigerant by heat-exchanging the refrigerant supplied from the compressor with a first coolant;

an evaporator connected to the condenser through the refrigerant line and configured to evaporate the refrigerant by heat-exchanging the refrigerant supplied from the condenser with the first coolant;

a gas injection device connected to the refrigerant line between the condenser and the evaporator and configured to selectively expand and flow the refrigerant supplied from the condenser and to selectively supply a portion of the supplied refrigerant to the compressor to increase a flow rate of the refrigerant circulating in the refrigerant line;

a first refrigerant connection line disposed between the compressor and the evaporator, the first refrigerant connection line having a first end connected to the refrigerant line and a second end connected to the gas injection device;

a chiller provided on the first refrigerant connection line and configured to adjust a temperature of the first coolant by heat-exchanging the refrigerant introduced through the first refrigerant connection line with a second coolant;

a second refrigerant connection line disposed between the compressor and the condenser, the second refrigerant connection line having a first end connected to the refrigerant line and a second end connected to the gas injection device; and a cooling apparatus comprising a radiator, an electrical component, and a battery module through which the first coolant circulates;

wherein the condenser is connected to the radiator through a first line for flowing the first coolant and is connected to a heater core through a second line for flowing the first coolant;

wherein the evaporator is connected to the radiator through a third line for flowing the first coolant and is connected to a cabin cooler through a fourth line for flowing the first coolant; and wherein the chiller is connected to the electrical component through a fifth line for flowing the first coolant and is connected to the battery module through a sixth line for flowing the first coolant; and wherein the gas injection device comprises:

a gas-liquid separator configured to separate and selectively discharge a gaseous refrigerant and a liquid refrigerant from the refrigerant, wherein the refrigerant is internally introduced;

a supply portion connected to the condenser through the refrigerant line and configured to receive the refrigerant supplied from the condenser;

a first expansion valve connected to the second refrigerant connection line, provided between the gas-liquid separator and the supply portion, and configured to selectively expand the refrigerant supplied to the second refrigerant connection line or the refrigerant supplied to the supply portion and to supply the expanded refrigerant to the gas-liquid separator;

a second expansion valve provided between the gas-liquid separator and the supply portion and configured to either selectively expand the refrigerant supplied to the supply portion and supply the expanded refrigerant to the chiller or to supply the refrigerant supplied from the gas-liquid separator to the chiller;

a third expansion valve provided between the gas-liquid separator and the supply portion and configured to either selectively expand the refrigerant supplied to the supply portion and supply the expanded refrigerant to the evaporator or to supply the refrigerant supplied from the gas-liquid separator to the evaporator;

a discharge portion connecting the gas-liquid separator to the second expansion valve and the third expansion valve and configured to discharge the refrigerant from the gas-liquid separator to the second expansion valve or the third expansion valve; and a supply line connecting the gas-liquid separator to the compressor and configured to selectively supply the gaseous refrigerant from the gas-liquid separator to the compressor.

15. The heat pump system of claim 14, wherein:

the first line is configured to be selectively opened to supply the first coolant to the condenser in a cooling mode and a heating mode of the vehicle; and the second line is configured to be opened to connect the condenser to the heater core in the heating mode of the vehicle.

16. The heat pump system of claim 14, wherein, in a case in which an ambient air heat is to be recollected in a heating mode of the vehicle, the third line is configured to be opened to connect the radiator to the evaporator.

17. The heat pump system of claim 14, wherein the fourth line is configured to be opened to connect the evaporator to the cabin cooler in a cooling mode of the vehicle.

18. The heat pump system of claim 14, wherein, in a case in which waste heat of the electrical component is to be recollected in a heating mode of the vehicle, the fifth line is configured to be opened to connect the chiller to the electrical component.

19. The heat pump system of claim 14, wherein, in a case in which the battery module is to be cooled in a cooling mode of the vehicle or in a case in which waste heat of the battery module is to be recollected in a heating mode of the vehicle, the sixth line is configured to be opened to connect the chiller to the battery module.

20. The heat pump system of claim 14, wherein the first expansion valve, the second expansion valve, and the third expansion valve are selectively operated in an air conditioning mode of the vehicle including a cooling mode, a heating mode, and a dehumidification mode, and are configured to selectively expand the refrigerant while controlling flowing of the refrigerant supplied to the gas injection device.

* * * * *